United States Patent

Oaks et al.

[15] 3,646,649

[45] Mar. 7, 1972

[54] GROOVING AND CUTOFF TOOL

[72] Inventors: Seibert S. Oaks, Everett; John F. Kita, Greensburg, both of Pa.

[73] Assignee: Kennametal Inc., Latrobe, Pa.

[22] Filed: Sept. 5, 1969

[21] Appl. No.: 855,704

[52] U.S. Cl. ................................................................ 29/96
[51] Int. Cl. ..................................................... B26d 1/00
[58] Field of Search................29/95 R, 95 A, 103 R, 105 R, 29/96 R

[56] References Cited

UNITED STATES PATENTS

| | | |
|---|---|---|
| 811,786 | 2/1906 | Miller ........................................ 29/96 |
| 1,484,332 | 2/1924 | Jaques, Jr. ................................. 29/96 |
| 2,737,705 | 3/1956 | Novkov ..................................... 29/96 |
| 3,140,627 | 7/1964 | Walby ..................................... 29/95 X |

*Primary Examiner*—Harrison L. Hinson
*Attorney*—Melvin A. Crosby

[57] ABSTRACT

A grooving and cutoff tool having a support body with an arcuate recess formed in one side adapted for receiving a tool support having one end curved to fit in the groove and having the other end extending beyond the end of the support block. A lever pivoted on the support block is adapted for clamping an insert on the tool support while simultaneously clamping the tool support on the support block.

14 Claims, 10 Drawing Figures

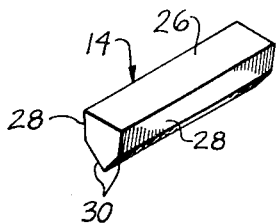
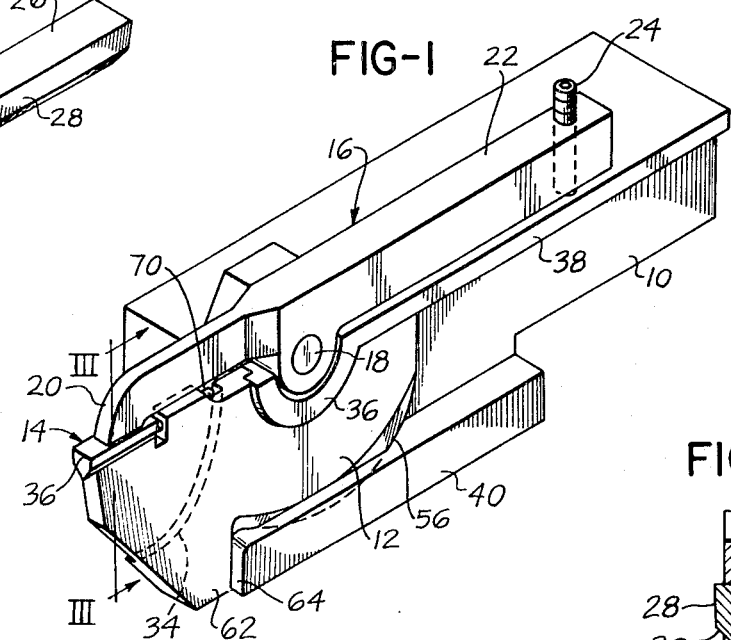
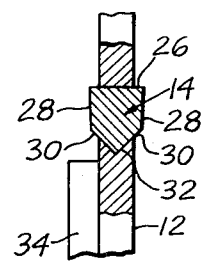
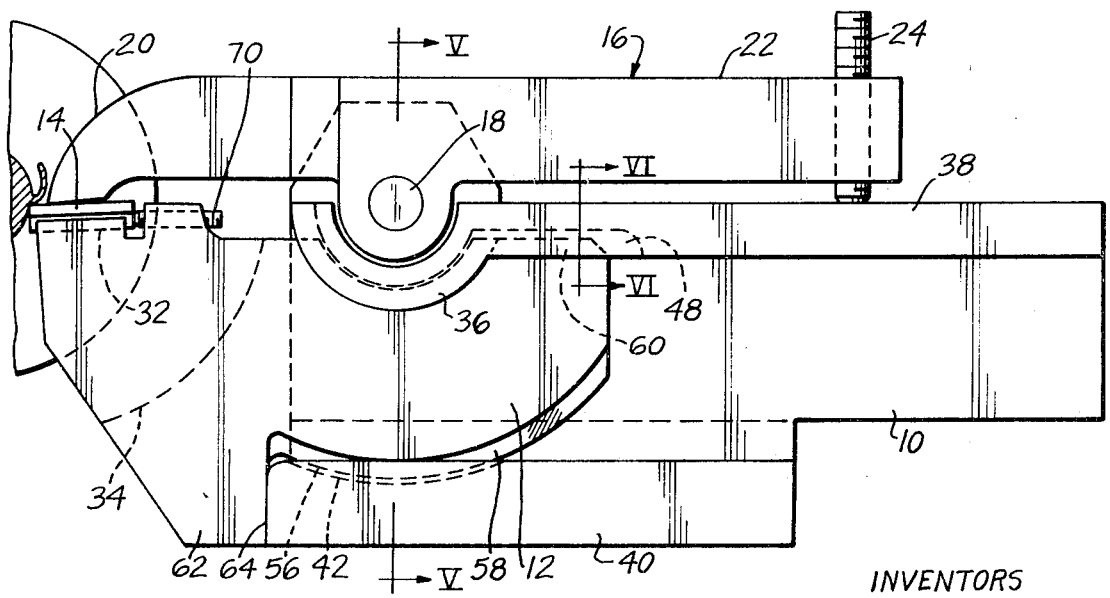

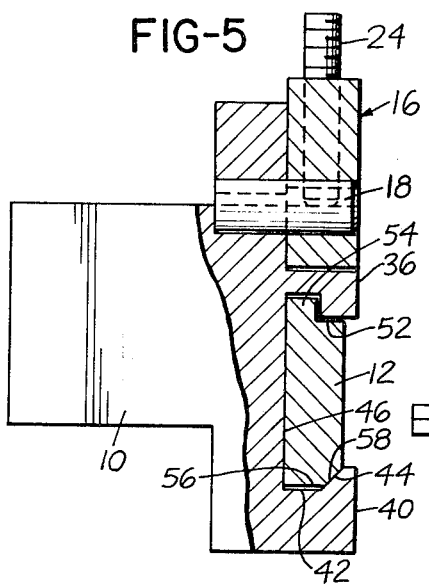
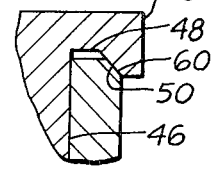
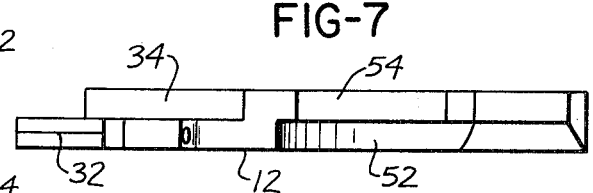
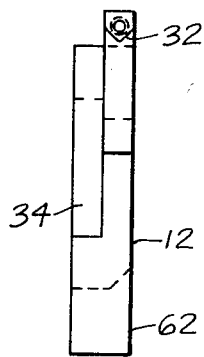
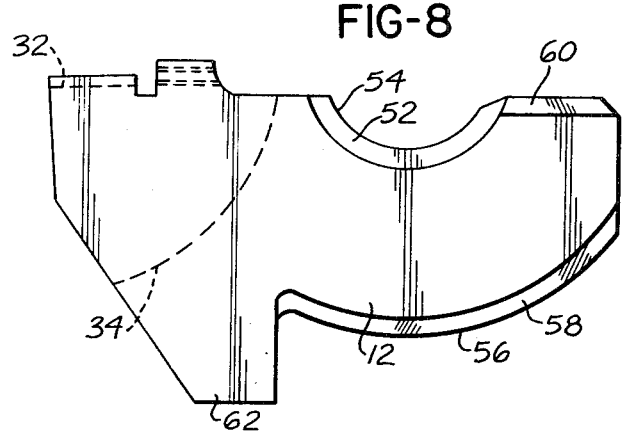
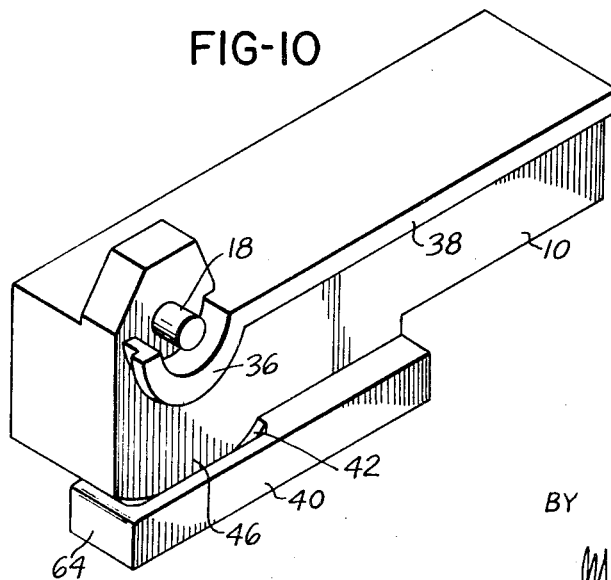

3,646,649

GROOVING AND CUTOFF TOOL

The present invention relates to a grooving and cutoff tool and especially such a tool adapted for taking extremely heavy cuts.

Grooving and cutoff operations are known in the art of machining metals and can be accomplished by using a fairly thin tool which is fed into the work while the work is rotating. Quite often such an operation requires the removal of a considerable amount of metal. Furthermore, especially with cutoff operations, it is desirable for the operation to be completed in the minimum length of time.

Still further, there is sometimes considerable overhang of the tool element and the direct support therefor beyond the main supporting tool block and this requires firm clamping of the tool element to prevent damage to the tool during heavy turning operations and to keep bending or deflection of the tool to a minimum.

With the foregoing in mind, a primary object of the present invention is the provision of a tool of the nature referred to which is extremely strong and can therefore take heavy cuts without deflecting.

A further object is the provision of a grooving and cutoff tool in which the cutting element is in the form of a replaceable insert.

Still another object is the provision of a grooving or cutoff tool in which the tool element is supported on an easily replaceable support member detachably connected to a main supporting block so that in the event of damage to the tool, the support member for the tool element can readily be replaced at nominal cost.

These and other objects and advantages of the present invention will become more apparent upon reference to the following detailed description taken in connection with the accompanying drawings in which:

FIG. 1 is a perspective view showing a grooving and cutoff tool according to the present invention;

FIG. 2 is a perspective view showing the replaceable cutting insert used with the tool;

FIG. 3 is a sectional view indicated by line III—III on FIG. 1 showing the insert in the support element therefor and the end of the clamp arm which holds the insert in place on its support element;

FIG. 4 is a side elevational view of the tool;

FIG. 5 is a vertical sectional view indicated by line V—V on FIG. 4;

FIG. 6 is a fragmentary sectional view indicated by line VI—VI on FIG. 4;

FIG. 7 is a top plan view looking down on the support element that supports the cutting insert;

FIG. 8 is a side view of the support element illustrated in plan in FIG. 7;

FIG. 9 is an end view of the support element looking in from the left side of FIG. 8; and FIG. 10 is a perspective view showing the block which carries the support element and the clamp arm.

BRIEF SUMMARY OF THE INVENTION

The present invention proposes a cutoff and grooving tool consisting of a main support block of substantial dimensions so as to be able to withstand any loads imposed thereon.

On one side of the block is formed a groove which is arcuate about an axis perpendicular to the one side. This groove is adapted to receive the correspondingly curved end on a barlike support member which, when the curved end thereof is disposed in the groove in the block, has its other end overhanging the end of the support block. The overhanging end of the support member is adapted for receiving a tool insert which is clamped in position by a clamp bar pivotally mounted on the support block and having a nose overhanging the insert.

The support member for the insert has a shoulder which engages an abutment on the support block when the curved end of the support member is in position in the groove in the block and the clamp member also serves to press the shoulder on the support member tightly against the shoulder on the block.

In this manner, the insert is tightly clamped on the support member therefor and the support member is tightly clamped on the support block and both the insert and the support member are prestressed in the direction in which they are loaded during grooving and cutoff operations. This prestressing substantially reduces deflection of the tool during use and reduces any tendency of the tool to chatter during a turning operation.

DETAILED DESCRIPTION

Referring to the drawings somewhat more in detail, the tool will be seen to comprise a main support block 10 on which is detachably mounted a bladelike support element 12. The support element 12 projects axially from one end of block 10 and carries a hard cutting insert 14 which is advantageously formed of a hard cemented carbide material, such as tungsten carbide. The cutting insert 14 rests in a groove provided therefor on support element 12 and is clamped in place by a clamp arm 16 pivotally mounted on a pin 18 carried by block 10 and having a nose portion 20 overlying insert 14 on one side of pin 18, and another part 22 extending over block 10 on the other side of pin 18. Part 22 carries a screw 24 by means of which the clamp arm can be pivoted about pin 18 into clamping and releasing positions with respect to insert 14.

As will be best seen in FIGS. 2 and 3, insert 14 has a flat top surface 26 and side walls 28 extending downwardly from the side edges of top surface 26 and convergent at an included angle of from 3° to 4° in the downward direction. From the lower extremities of sidewalls 28 there extend the bottom walls 30 which converge at an angle of 90 degrees with each other.

The end of support element 12 on which the insert 14 rests is formed with a 90° notch 32 which engages the bottom walls 30 of insert 14. In FIG. 3 it will be noted that the portion of support element 12 engaging the bottom of insert 14, and the end of nose portion 20 of the clamp arm 16 that engages the top of insert 14, are narrower in the lateral direction than insert 14 so as not to come into interference with the side walls of the groove formed by insert 14 as it is advanced into the work.

Support element 12 is provided with an arcuate recess portion 34 substantially concentric with the cutting edge 36 of insert 14 to maintain support element 12 at the necessary degree of thickness for a substantial distance backwardly from the insert 14 while permitting the remainder of support element 12 to have sufficient thickness in the lateral direction to provide strong support for insert 14.

Body 10, concentrically with pin 18 is provided with a circular grooved flange 36 which joins a straight flange 38 that continues rearwardly along the top side edge of block 10. Arranged in opposition to the flanges 36 and 38 is a bottom flange 40. Bottom flange 40, concentrically with pin 18 and flange 36 is provided with a curved notch 42 having an inclined surface 44 on the side thereof facing a flat wall 46 on the block extending between flanges 38 and 40.

The underside of flange 38 rearwardly of the circular flange 36 is also provided with a notch 48 having the wall opposite the flat wall 46 of block 10 provided with an inclined surface 50.

The aforementioned support element 12, rearwardly of the arcuate recess 34 referred to, is provided on its top edge with a semicircular recess 52 having a radial flange 54 adapted for engaging the groove of circular flange 36 of the block as will be seen in FIGS. 4 and 5. Furthermore, the bottom edge of support element 12, concentrically with recess 52 is provided with an edge 56 having its outer surface inclined as at 58 for cooperation with inclined surface 44 of notch 42.

Still further, the extreme rear end of the top edge of support element 12 is provided with an inclined side 60 for cooperation with inclined surface 50 of notch 48. Finally, at the bottom of support element 12 toward the front there is a dependent leg 62 adapted for abutting engagement with the front end 64 of block 10 at the front end of flange 38.

The support element 12 is readily mountable on and detachably from block 10 by loosening screw 24 and then removing clamp arm 16 from pin 18. Support element 12 can then be turned in a clockwise direction as it is viewed in FIG. 4 and removed from block 10. In assembling support element 12 with block 10, the support element 12 is introduced axially into the space between flanges 36 and 40 and turned in a counterclockwise direction and this will bring it into the position in which it is shown in FIGS. 1 and 4.

Thereafter, the clamp arm 16 can be mounted on pin 18 and the insert 14 placed in position, and screw 24 rotated to tilt the clamp arm into clamping engagement with insert 14. Clamping of insert 14 will also press support element 12 into position on block 10 with surfaces 58 and 60 of the support element, and surfaces 44 and 50 respectively of the block 10 in tight wedging engagement and with support element 12 thereby thrust firmly against flat vertical wall 46 of block 10.

Also, the dependent portion 62 on the bottom of support element 12 is driven tightly against the end surface 64 of block 10. The support element 12 and block 10 in this manner are fixedly interconnected and extremely heavy cuts can be taken by insert 14 thereby rapidly to form accurate grooves and rapidly to carry out cutoff operations.

The insert 14 is relatively small and is, therefore, inexpensive and thus can be thrown away when both ends have become dulled. However, it is also possible to grind the ends of insert 14 to restore the end transverse edges thereof to sharp condition and the insert, thus sharpened, can then be reused. A backup screw 70 in support element 12 can be employed for adjusting insert 14 axially on support element 12 to obtain the proper projection of the cutting insert outwardly from the support element.

The support element 12 is formed so as to be strong against bending and thus has long life but it can, nevertheless, readily be replaced if it should become necessary. The block 10, due to its massive construction, will withstand any loads imposed thereon and, in the normal course of events, does not need to be replaced but will last for an indefinite length of time. The support element 12 also has long life but due to the extreme rapidity with which grooving and cutting off operations can take place, high loads are imposed on support element 12, and the possibility of damaging support element 12 is present and for this reason it has been made readily removable from block 10 for repair or replacement as might become necessary.

We claim:

1. In a grooving and cutoff tool; a block, a groove extending into the block at one end and curved so as to be concave upwardly, a support member having one end in the form of a curved shank extending into said groove and the other end projecting from said one end of the block and having an upwardly opening notch at the extremity remote from the block for receiving a cutting insert, a clamp arm mounted on said block and overhanging said notch and adjustable into clamping engagement with the top of an insert in said notch, said clamp arm acting downwardly on said insert to clamp said insert to said support member and to clamp said support member to said block, said support member having a rearwardly facing shoulder which engages said one end of said block and sustains the clamping load of said clamp arm.

2. A tool according to claim 1 in which said groove is formed in one side face of said block.

3. A tool according to claim 1 in which said support member is barlike and the shoulder thereon is substantially in the plane of action of said clamp arm.

4. A tool according to claim 1 in which said block comprises a pivot pin and said clamp arm is pivotally mounted on said pin.

5. A tool according to claim 4 in which said pivot pin is located at the center of curvature of said groove.

6. A tool according to claim 1 in which the opposed edges of said groove are provided with recesses and the opposite edges of said shank are formed to fit slidably in said recesses.

7. A tool according to claim 6 in which the convex side of said shank and at least the extremity of said shank on the concave side are tapered, and said recesses comprising tapered regions to receive said tapered portions of said shank.

8. In a grooving and cutoff tool, an elongated block, upper and lower ledges projecting laterally from said block at the top and bottom and along one side of the block and extending from one end of the block toward the other end, an upwardly concave recess in the top surface of the said lower ledge, the said upper ledge in the region thereof over said recess curving downwardly toward said recess about the same center of curvature as said recess and having a recess therein rectangular in cross section, a barlike support member having a shank on one end having a lower edge formed to fit in the recess in the lower ledge and an upper edge formed to fit in the recess in the upper ledge, the other end of said support member projecting from said one end of said block and having an upwardly facing cutting insert receiving notch in the extremity therein, a clamp arm mounted on said block and having an end part disposed over said notch, said clamp arm being adjustable to move said end part toward said notch to clamp an insert therein, and said support member having a dependent portion on the bottom engaging the end of said block and sustaining the clamping load of said clamp arm and cutting loads imposed on an insert in said notch.

9. A tool according to claim 8 in which said upper ledge on the side of curved region thereof opposite said one end of said block has a further recess therein, the extreme end of said shank fitting in said further recess when the support member is assembled with said block.

10. A tool according to claim 9 in which the recesses in said ledges have one side in the plane of said one side of said block, the side of the recess in the lower ledge and the side of said further recess in the upper ledge opposite said one side converging with said one side toward the bottom of the respective recess, and the edges of said support member fitting the recess in the lower ledge and the said extreme end of said shank being inclined on the side of the support member facing away from said one side of said block so that clamping of the support member to the block will force it toward said one side of the block.

11. A tool according to claim 10 in which said clamp arm is pivoted between its ends to said block and comprises actuating means on the end opposite said end part which engages an insert.

12. A tool according to claim 11 in which said notch is "V" shaped and is adapted for receiving an insert wider than said other end of said support member and also wider than said end part of said clamp arm.

13. A tool according to claim 12 in which said support member comprises an adjustable abutment for engagement with the inner end of an insert in said notch.

14. A tool according to claim 13 in which said support member from the end of the shank portion thereof to a region radially spaced from the outer end of an insert in said notch is substantially thicker than the remainder thereof.

* * * * *